US012017904B2

(12) United States Patent
Lucas et al.

(10) Patent No.: US 12,017,904 B2
(45) Date of Patent: Jun. 25, 2024

(54) FUEL DISPENSING NOZZLE HAVING SINGLE-HANDED HOLD OPEN MECHANISM

(71) Applicant: Gilbarco Inc., Greensboro, NC (US)

(72) Inventors: David Lucas, Altoona, PA (US); Brian Christopher Worley, Beavercreek, OH (US); Niranjan Srinivasan, Beavercreek, OH (US); Brandon Kirby, Beavercreek, OH (US); Andres Deogracias Viduya, Export, PA (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 18/196,799

(22) Filed: May 12, 2023

(65) Prior Publication Data

US 2023/0278855 A1 Sep. 7, 2023

Related U.S. Application Data

(60) Division of application No. 17/391,792, filed on Aug. 2, 2021, now Pat. No. 11,673,792, which is a (Continued)

(51) Int. Cl.
*B67D 7/50* (2010.01)

(52) U.S. Cl.
CPC .................................... *B67D 7/50* (2013.01)

(58) Field of Classification Search
CPC ...................................................... B67D 7/50
See application file for complete search history.

(56) References Cited

U.S. PATENT DOCUMENTS 3,273,609 A * 9/1966 Carder et al. ............ B67D 7/50 141/206
3,323,560 A 6/1967 Karlheinz
(Continued)

FOREIGN PATENT DOCUMENTS

EP 1236678 A1 9/2002
WO 2016168739 A1 10/2016

OTHER PUBLICATIONS

International Search Report and Written Opinion dated Aug. 14, 2020 in PCT international application serial No. PCT/US2020/033813, all enclosed pages cited.

*Primary Examiner* — Jason K Niesz
(74) *Attorney, Agent, or Firm* — Nelson Mullins Riley & Scarborough LLP

(57) ABSTRACT

A fuel dispensing nozzle comprises a nozzle body defining a dispensing path extending between a distal inlet and a proximal outlet and configured to dispense fuel. A fuel flow valve is disposed in the nozzle body between the distal inlet and the proximal outlet. An actuation assembly movable to open the fuel flow valve is also provided. The nozzle also includes a shut-off mechanism operatively connected to the actuation assembly. A hand lever is pivotally connected with respect to the nozzle body, the hand lever being operatively connected to the actuation assembly so as to cause opening of the fuel flow valve when the hand lever is pivoted in a valve opening direction. The hand lever has a grasping portion extending between a proximal location nearer the proximal outlet and a distal location. The nozzle according to this aspect further includes a hold open mechanism including a trigger disposed at the proximal location of the hand lever. The trigger is pivotally connected to the hand lever and has an engaging element. A catch member is fixed with respect to the nozzle body and defines a plurality of
(Continued)

catches corresponding to respective flow positions. The catches are each configured to receive the engaging element of the trigger.

10 Claims, 5 Drawing Sheets

Related U.S. Application Data continuation of application No. 16/879,394, filed on May 20, 2020, now Pat. No. 11,078,068.

(60) Provisional application No. 62/850,541, filed on May 20, 2019.

(56) References Cited

U.S. PATENT DOCUMENTS

| | | | | |
|---|---|---|---|---|
| 3,638,689 | A | 2/1972 | Eklund | |
| 3,908,721 | A | 9/1975 | McGahey et al. | |
| 3,938,565 | A | 2/1976 | Robinson, Jr. et al. | |
| 4,016,910 | A | 4/1977 | Dumpis et al. | |
| 5,067,533 | A | 11/1991 | Carder, Sr. et al. | |
| 5,341,855 | A | 8/1994 | Rabinovich | |
| 5,379,811 | A | 1/1995 | Dotson et al. | |
| 5,435,356 | A | 7/1995 | Rabinovich | |
| 5,469,900 | A | 11/1995 | Weeks et al. | |
| 5,645,115 | A | 7/1997 | Kesterman et al. | |
| 7,082,972 | B1 | 8/2006 | Healy | |
| 8,061,394 | B2 | 11/2011 | Weh et al. | |
| 8,167,003 | B1 | 5/2012 | Clever et al. | |
| 8,286,677 | B2 | 10/2012 | Grantham | |
| 8,434,531 | B2 | 5/2013 | Grantham | |
| 8,499,802 | B2 | 8/2013 | Falckenberg et al. | |
| 8,752,597 | B2 | 6/2014 | Tumarkin | |
| 8,863,791 | B2 | 10/2014 | Aehle et al. | |
| 9,242,849 | B2 | 1/2016 | Kunter et al. | |
| 11,078,068 | B2 | 8/2021 | Lucas et al. | |
| 11,673,792 | B2 | 6/2023 | Lucas et al. | |
| 2004/0045627 | A1* | 3/2004 | Carmack | B67D 7/50 141/206 |
| 2016/0347602 | A1 | 12/2016 | Clever et al. | |

* cited by examiner

FUEL DISPENSING NOZZLE HAVING SINGLE-HANDED HOLD OPEN MECHANISM

CROSS-REFERENCE TO RELATED APPLICATIONS

This application is a divisional of copending application Ser. No. 17/391,792, filed Aug. 2, 2021, which is a continuation of application Ser. No. 16/879,394, filed May 20, 2020, now U.S. Pat. No. 11,078,068, which is based upon and claims the benefit of provisional application Ser. No. 62/850,541, filed May 20, 2019. The aforementioned applications are incorporated fully herein by reference for all purposes.

FIELD OF THE INVENTION

The present invention relates generally to the art of fuel dispensing nozzles. More particularly, it relates to a fuel dispensing nozzle having a hold open mechanism configured to be operated by the same hand as the nozzle's actuation lever.

BACKGROUND

Fuel dispensing facilities are in widespread use, providing customers with liquid fuel for various applications. A common fueling transaction, where fuel is dispensed into a vehicle fuel tank, typically proceeds as follows: The customer indicates to the fuel dispenser the type of fuel desired and a payment method. The fuel dispenser authorizes payment and allows pressurized fuel to be available for dispensing. The customer places the nozzle into the vehicle fuel tank and pulls the lever of the nozzle to open a valve and dispense the desired amount of fuel.

Fuel dispensing nozzles are often equipped with hold open mechanisms that allow the lever to remain in an open flow position without the need to be continuously grasped by the user. In a typical arrangement, the hold open mechanism includes a latch member which pivotally engages with one of a series of catches in the desired flow position. Oftentimes, the latch member will be located at the distal end of the lever with the catches being located at the back of the hand guard in which the lever is located. When the hold open mechanism is actuated, fuel will continue to flow until the hold open mechanism is manually released or until the vehicle's tank is full causing the nozzle's shutoff mechanism to trip.

While current hold open mechanisms have worked reasonably well, they are not without disadvantages. For example, hold open mechanisms such as the one described above generally require a second hand to actuate. Specifically, because the latch member is located at the distal end of the lever and the user is gripping the lever with one hand (presumably the user's dominant hand), the other hand is required to position or release the latch member relative to the desired catch. In addition, there can be manufacturing variations between the nozzle body, hand guard, and lever which exacerbate tolerance issues between the latch member and the catch. This can cause the hold open mechanism to repeatedly trip at undesired times.

SUMMARY

The present invention recognizes the foregoing, and other, considerations of the prior art.

One aspect of the present invention provides a fuel dispensing nozzle comprising a nozzle body defining a dispensing path extending from a distal inlet to a proximal outlet and configured to dispense fuel. A fuel flow valve is disposed in the nozzle body between the distal inlet and the proximal outlet. An actuation assembly movable to open the fuel flow valve is also provided. The nozzle also includes a shut-off mechanism operatively connected to the actuation assembly. A hand lever is pivotally connected with respect to the nozzle body, the hand lever being operatively connected to the actuation assembly so as to cause opening of the fuel flow valve when the hand lever is pivoted in a valve opening direction. The hand lever has a grasping portion extending between a proximal location nearer the proximal outlet and a distal location.

The nozzle according to this aspect further includes a hold open mechanism including a trigger disposed at the proximal location of the hand lever. The trigger is pivotally connected to the hand lever and has an engaging element. A catch member is fixed with respect to the nozzle body and defines a plurality of catches corresponding to respective flow positions. The catches are each configured to receive the engaging element of the trigger.

In exemplary embodiments, the actuation assembly may comprise a dual shaft assembly having a first shaft axially movable with respect to a second shaft. For example, the second shaft may be coaxially mounted in the first shaft and urged apart from the first shaft by an actuation assembly spring. A lesser force due to the actuation assembly spring alone is insufficient to maintain the engaging element of the trigger in the catch.

In exemplary embodiments, the shut-off mechanism may include a piston in fluid communication on one side with a shut-off port defined in the nozzle body. The shut-off mechanism may also carry at least one locking roller forming a releasable locking mechanism between the first shaft and the second shaft.

In exemplary embodiments, the hand lever may be generally L-shaped with a shorter portion and a longer portion substantially perpendicular to each other, the longer portion forming the grasping portion. The trigger may be pivotally connected to the hand lever at a pivot point substantially at an intersection of the shorter portion and the longer portion of the hand lever.

In exemplary embodiments, the hold open mechanism may further include a spring urging the trigger into a free state. In addition, each of the catches of the catch member may be generally U-shaped having a leading side and a trailing side, the leading side being oriented in a direction that is substantially normal to a line extending between the engaging element of the trigger when disposed in the catch and a pivot point at which the trigger is pivotally connected to the hand lever. The catch member may be connected directly to the nozzle body.

In exemplary embodiments, a spring-loaded check valve may be located in the nozzle body. Moreover, a coil spring may be mounted axially with respect to the fuel flow valve to urge the fuel flow valve into a closed position.

Another aspect of the present invention provides a fuel dispensing nozzle comprising a nozzle body defining a dispensing path. A fuel flow valve is disposed in the nozzle body. An actuation assembly movable to open the fuel flow valve is also provided. A hand lever is pivotally connected with respect to the nozzle body, the hand lever being operatively connected to the actuation assembly so as to cause opening of the fuel flow valve when the hand lever is pivoted in a valve opening direction.

The nozzle according to this aspect further includes a hold open mechanism including a trigger pivotally connected to the hand lever and having an engaging element. A catch member is fixed with respect to the nozzle body, the catch member defining a plurality of catches corresponding to respective flow positions, each of the catches configured to receive the engaging element of the trigger. Specifically, each of the catches according to this aspect is generally U-shaped having a leading side and a trailing side, the leading side being oriented in a direction that is substantially normal to a line extending between the engaging element of the trigger when disposed in the catch and a pivot point at which the trigger is pivotally connected to the hand lever.

A still further aspect of the present invention provides a fuel dispensing nozzle comprising a nozzle body defining a dispensing path extending from a distal inlet to a proximal outlet and configured to dispense fuel. A fuel flow valve is disposed in the nozzle body between the distal inlet and proximal outlet. An actuation assembly is movable to open the fuel flow valve, the actuation assembly comprising a dual shaft assembly having a first shaft axially movable with respect to a second shaft, the second shaft being urged apart from the first shaft by an actuation assembly spring, wherein a lesser force due to the actuation assembly spring alone is insufficient to maintain the engaging element of the trigger in the catch.

The nozzle according to this aspect further comprises a hand lever pivotally connected with respect to the nozzle body, the hand lever being operatively connected to the actuation assembly so as to cause opening of the fuel flow valve when the hand lever is pivoted in a valve opening direction. A hold open mechanism is also provided, including a trigger pivotally connected to the hand lever and having an engaging element. A catch member is fixed with respect to the nozzle body, the catch member defining a plurality of catches corresponding to respective flow positions, each of the catches being configured to receive the engaging element of the trigger.

Additional aspects of the present invention are provided by various other combinations and subcombinations of the disclosed elements, as well as methods of practicing same.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
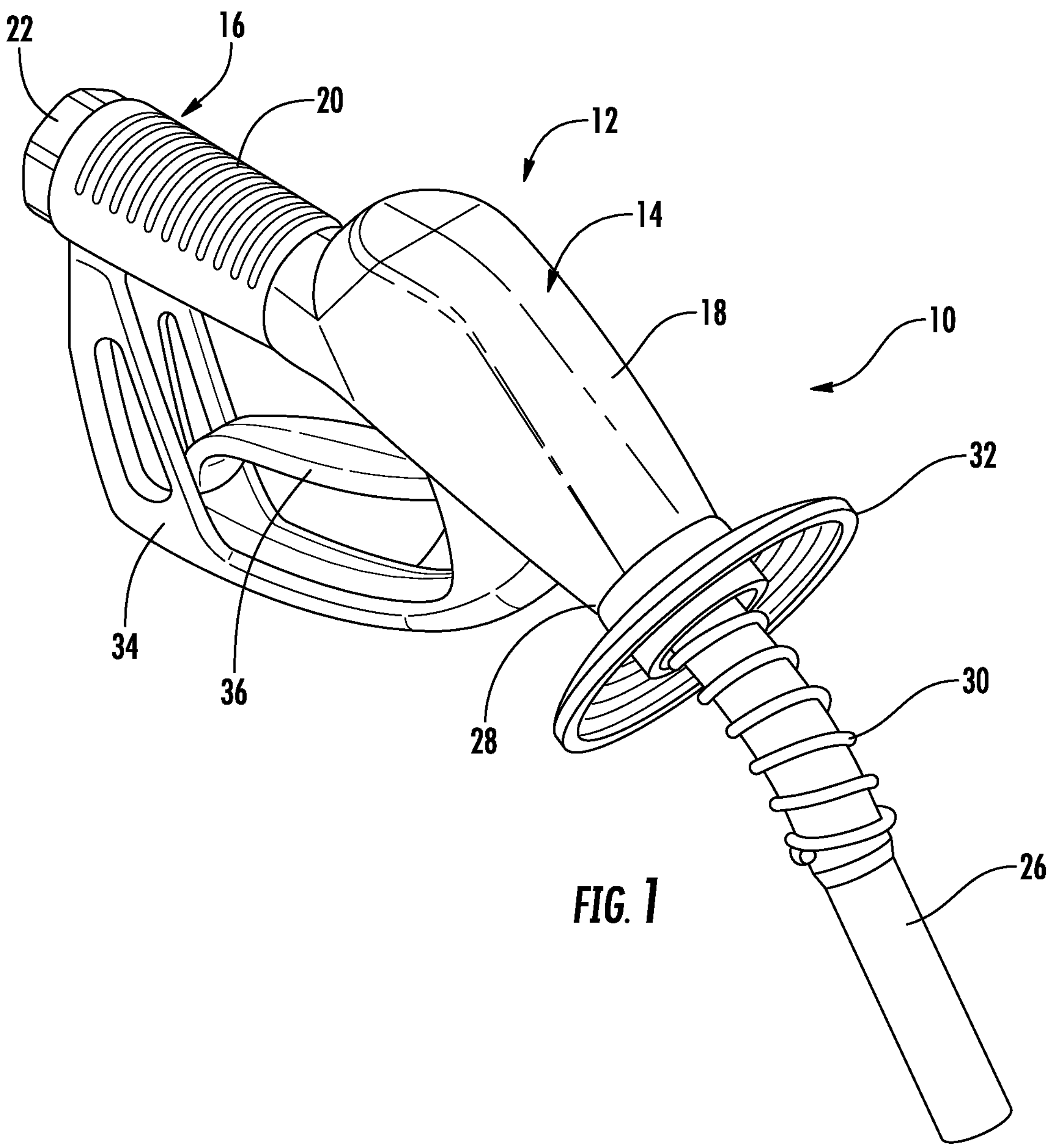
FIG. 1 is a perspective view of a fuel dispensing nozzle in accordance with an embodiment of the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

FIG. 1 is a perspective view of a fuel dispensing nozzle 10 in accordance with an embodiment of the present invention. Nozzle 10 includes a nozzle body (generally 12) defining a main portion 14 and a handle portion 16. In this particular embodiment, the main portion 14 is substantially encased by a separate scuff guard 18 to lessen the occurrence of scratches and other damage to main portion 14. Similarly, handle portion 16 may be covered, as shown, by a separate "hand warmer" 20 to provide greater comfort for the user. Hand warmer 20 may, for example, have a textured outer surface to allow the user to maintain a better grip on nozzle 10. In some preferred embodiments, scuff guard 18 and hand warmer 20 may be formed of a suitable polymeric material.

The distal end 22 of nozzle body 12 defines an inlet 24 (FIG. 2) for ingress of the fuel to be dispensed. In this regard, distal end 22 may preferably have a suitable fitting for attachment of a fuel dispenser hose. A spout 26 is in fluid communication with and extends from a fuel outlet at the proximal end 28 of nozzle body 12. In this embodiment, an unleaded spout spring 30 is located around a portion of the spout 26. In addition, a splash guard 32 is located at the end of spring 30 adjacent the proximal end 28 of nozzle body 12. A hand guard 34 extends from the nozzle body 12 and contains a hand lever 36. As is well-understood, hand lever 36 is grasped by a user and squeezed in order to allow flow of fuel though nozzle 10.

Figure 2:
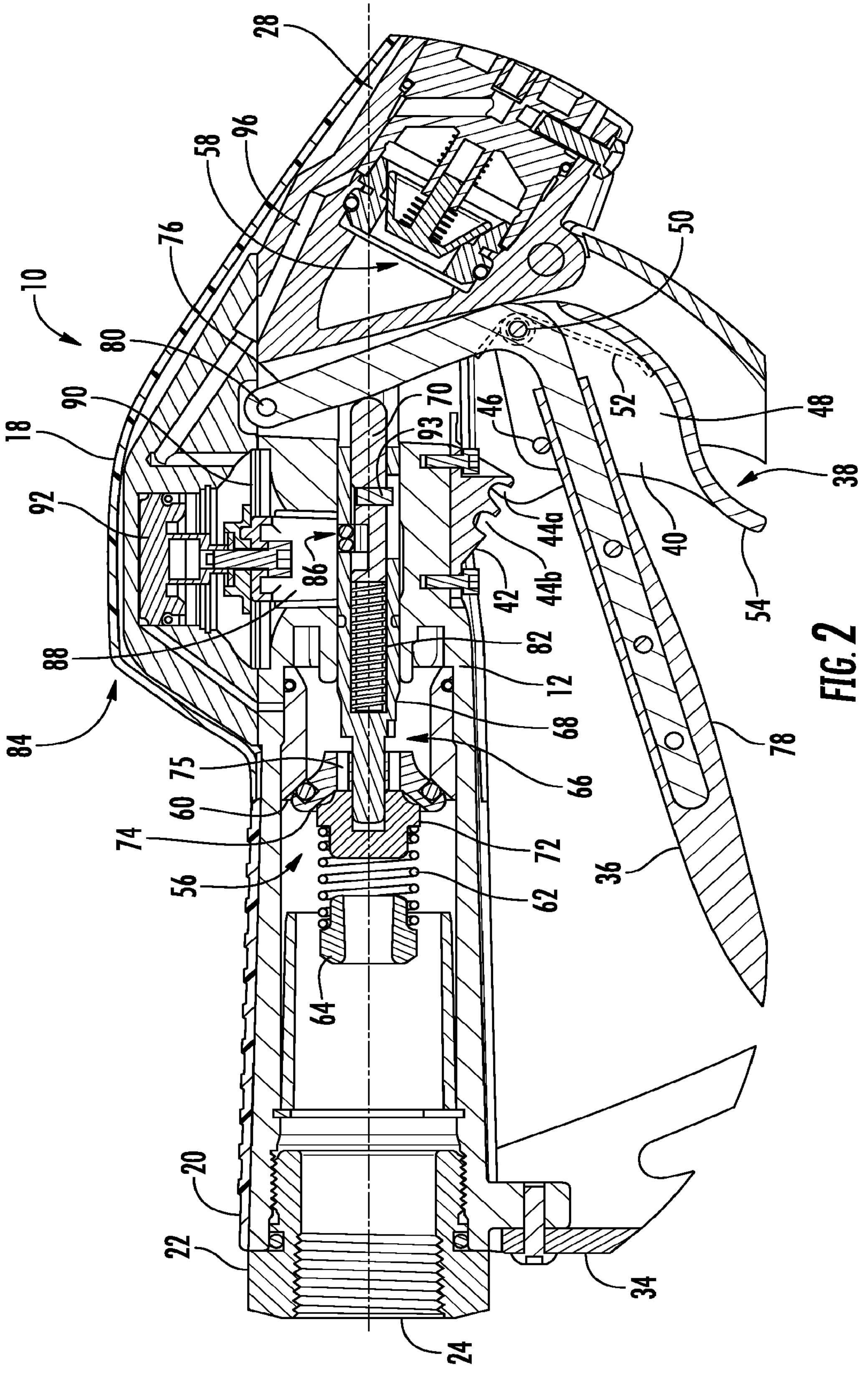
FIG. 2 is an enlarged fragmentary cross-sectional view of the nozzle body of the nozzle of FIG. 1 with the flow valve in a closed position.

Referring now to FIG. 2, nozzle 10 includes a hold open mechanism 38 allowing the user to maintain the hand lever 36 in a desired flow position without continuing to squeeze it. In this embodiment, the hold open mechanism comprises a trigger 40 pivotally connected to lever 36 that operatively engages a catch member 42 attached to nozzle body 12 (such as by screws as shown). Catch member 42 defines a plurality of catches (in this case two catches) corresponding to respective lesser and greater flow positions. In this embodiment, the respective catches are each formed as generally U-shaped notches **44*a-b* that receive an engaging member 46 of the trigger 40. Attachment of catch member 42 to nozzle body 12 advantageously overcomes variations between the lever, nozzle body, and hand guard which have created issues in hold open mechanisms of the prior art. The engaging member 46 in this embodiment comprises a cross pin carried by the body 48 of trigger 40 at a location spaced apart from the trigger's pivot point 50**.

Trigger 38 is moved by the user, such as by the user's index finger of the same hand that is squeezing lever 36, against the bias of a torsion spring 52 located around pivot point 50. Toward this end, trigger body 48 may include a tab portion 54 at the end opposite the pivot point 50 which is contoured to facilitate engagement by the user's finger. As can be seen in FIG. 2, the engaging member 46 normally rests against lever 36 in order to limit rotation of trigger 38 in the "free state" (i.e., the condition in which the hold open mechanism is not being used to maintain fluid flow).

Certain other aspects of nozzle 10 will now be explained with reference to FIGS. 2-4. As noted above, nozzle body 12 has an inlet port 24 into which fuel from a connected hose will flow. When a fuel flow valve 56 is open, the fuel will continue through nozzle body 12 to an outlet of the nozzle body and into the spout 26. A check valve 58 opens under the fuel pressure to allow the flow, but closes when fuel is not being supplied in order to prevent any back flow.

Flow valve 56 is urged against a stationary valve seat 60 by a coil spring 62. As shown, coil spring 62 extends axially between flow valve 56 and a spring base member 64 that is fixed with respect to nozzle body 12. For example, base member 64 may be attached by one or more radial arms (not shown) to an inner surface of nozzle body 12. In a preferred embodiment, spring 62 may have a spring force falling in a range of 18 to 20 pounds, with a spring rate of 14.31 lbs/inch being used in one exemplary embodiment.

Flow valve 56 is pushed to the open position by a valve stem that is part of a dual shaft assembly 66 having a first outer shaft 68 and a second inner shaft 70. In particular, the valve stem is formed by an end of outer shaft 68. In this embodiment, flow valve 56 is actually a two-part valve having a primary poppet 72 and a secondary poppet 74. As shown, secondary poppet 74 is configured to form a valve seat for primary poppet 72. As illustrated in FIG. 3, axial movement of the valve stem against the force of spring 62 first separates primary poppet 72 from secondary poppet 74 to provide a first lesser rate of fuel flow through the nozzle (e.g., through passage 75). As shown in FIG. 4, further movement of the valve stem causes a larger diameter portion (i.e., a shoulder) of the valve stem to engage secondary poppet 74. Secondary poppet 74 is thus separated from seat 60 to provide a second greater rate of fuel flow through the nozzle. These lesser and greater rates of fuel flow correspond to catches 44*a-b*, respectively.

Dual shaft assembly 66 is pushed toward the inlet 24 when the user grasps lever 36. In this embodiment, lever 36 is generally L-shaped, having a shorter portion 76 and a longer (grasping) portion 78. Pivot point 50 of trigger 38 is in this case located substantially at the intersection of shorter portion 76 and longer portion 78, as shown. Lever 36 is itself pivotally connected at the end of shorter portion 76 at a pivot point 80. As can be seen, pivot point 80 is in this case located near the top of nozzle body 12. A middle portion of shorter portion 76 engages the inner shaft 70 of dual shaft assembly 66 to move it toward the inlet 24. This causes outer shaft 68 to also move and open flow valve 56. When lever 36 is not being grasped (and when the hold open mechanism is not actuated), it is urged to the at rest portion shown in FIG. 2 by an internal spring 82 of dual shaft assembly 66. In a preferred embodiment, spring 82 may have a spring force falling in a range of 4 to 8 pounds, with a spring rate of 15.00 lbs/inch being used in one exemplary embodiment.

As will now be described, dual shaft assembly 66 operates in conjunction with the nozzle's shut-off mechanism 84 to close flow valve 56 when the vehicle's tank is full. Mechanism 84 includes suitable locking elements, such as a plurality (e.g., two) rollers 86 carried by a roller holder 88. Holder 88 is attached to the underside of a diaphragm 90 and in this case includes a pair of lateral slots allowing the rollers 86 to move forward and aft with respect to the axial position of holder 88. Diaphragm 90 is itself connected on the other side to a piston 92 via a spring. Piston 92 can reciprocate in a sensing chamber in the nozzle body 12 defined by the diaphragm. Piston 92 is urged normally upward to the position shown in FIG. 2 by a spring.

As can be seen, one side of piston 92 is in fluid communication with an upstream side of the fuel flow path via a channel 94. The other side of piston 92 is in fluid communication with a sensing port at the tip of nozzle 26 via a channel 96. During a normal dispensing event, shaft 70 is locked with respect to shaft 68 (as shown in FIGS. 3 and 4) by rollers 86. As a result, dual shaft assembly 66 will operate as a unit to open flow valve 56. This allows fuel to flow.

Figure 3:
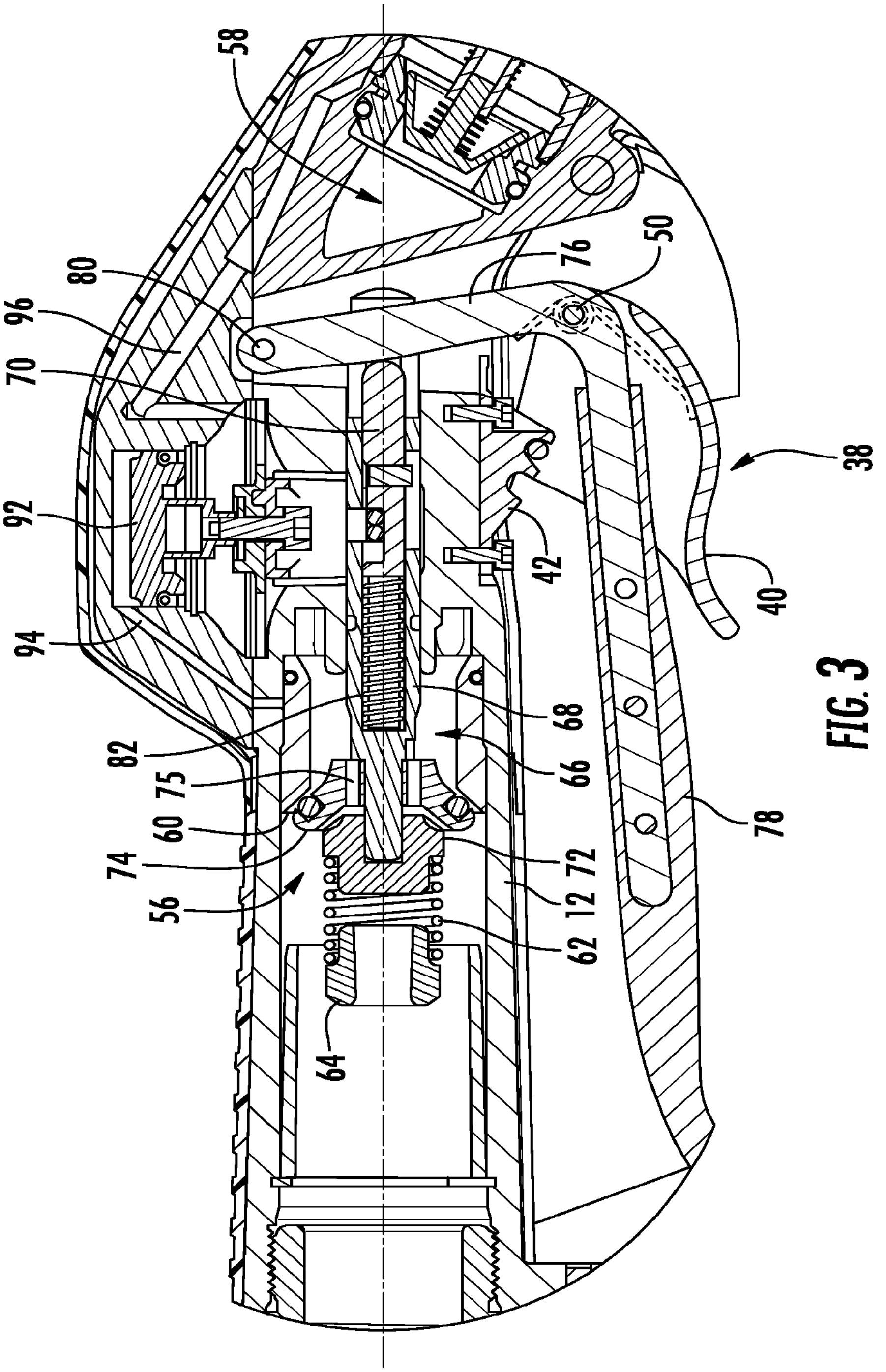
FIG. 3 is an enlarged fragmentary cross-sectional view similar to FIG. 2 but with the flow valve in an open position at a first lesser flow.
Figure 4:
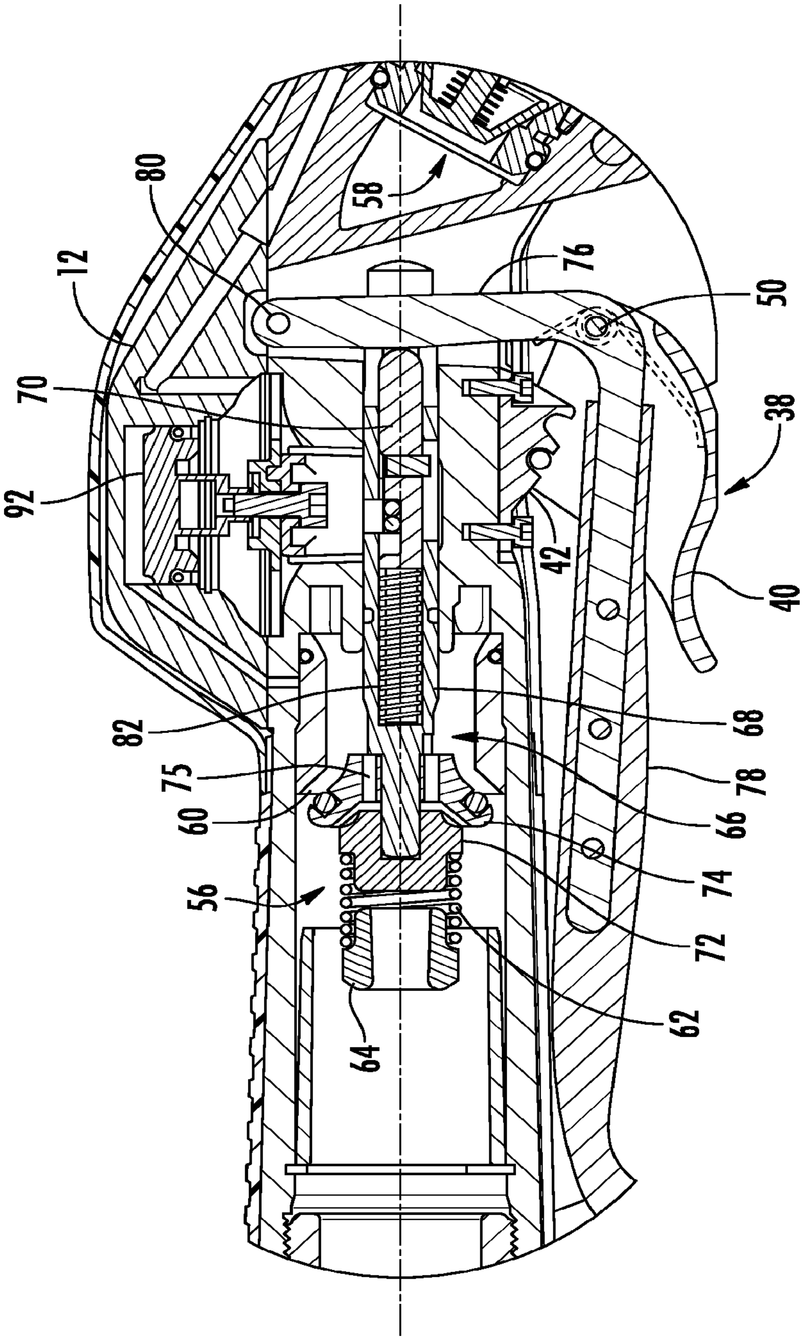
FIG. 4 is an enlarged fragmentary cross-sectional view similar to FIG. 3 but with the flow valve in an open position at a second greater flow.
Figure 5:
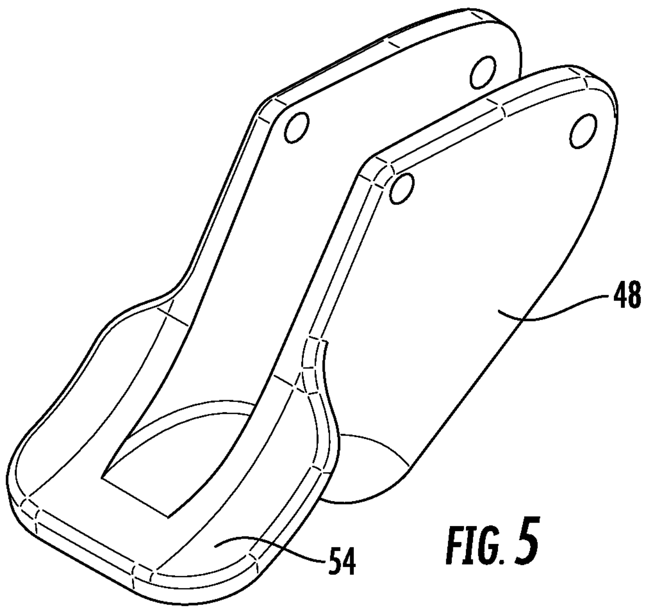
FIG. 5 is an enlarged perspective view of a preferred form of a trigger body that can be used with the hold open mechanism in the embodiment of FIG. 1.

As shown in FIGS. 3 and 4, fuel pressure causes fuel to accumulate on one side of piston 92, pushing it down. As a result, diaphragm 90 flexes down, moving rollers 86 into engagement with inner shaft 70 (as well as outer shaft 68). Note that the transverse channel in shaft 70 that receives the rollers has an axial width greater than the combined diameter of the two rollers in order to allow the rollers to more easily seat. Fuel flowing past the sensing port causes it to act as a venturi, generating a vacuum between diaphragm 90 and piston 92. This urges diaphragm 90 to move upward but it is resisted by the spring force. When the tank is full, the presence of fuel at the sensing port causes the vacuum to increase suddenly, causing diaphragm 90 to retract upward against the spring. This moves rollers 86 out of engagement with shaft 70. Because of spring 82, shaft 70 is now urged toward the shorter portion of lever 36. (Dowel 93 is fixed with respect to shaft 70 and moves in a longitudinal channel defined in shaft 68 to prevent relative rotation between the shafts.) In addition, because shaft 68 is no longer locked with shaft 70, spring 62 will push flow valve 56 fully closed. This will cause closure of flow valve 56 and release of the hold open mechanism.

Figure 6:
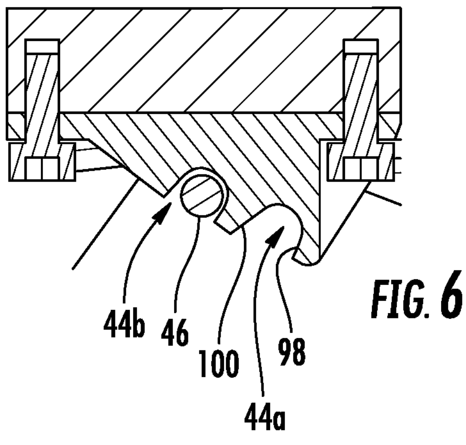
FIG. 6 is an enlarged fragmentary view showing a catch member attached to the nozzle body with the trigger engaged in accordance with the embodiment of FIG. 1.

Referring now also to FIG. 6, certain additional aspects of the hold open mechanism can be most easily explained. As described above, catches 44*a* and 44*b* preferably have a U-shaped configuration, each with a leading side 98 and a trailing side 100. The leading sides are substantially perpendicular to an axis extending from the respective leading side to the pivot point 50 when the engaging element 46 is situated in that catch. When fuel is flowing normally (i.e., the shut-off mechanism is not activated), the total force, including that contributed by the expected fuel pressure and the spring 62, causes the hold open mechanism to be held in the locked state. When the flowing state stops, the dual shaft assembly locking mechanism decouples causing the fuel valve spring and fuel pressure forces to no longer be transmitted. At this state, the only force transmitted to the trigger and locking mechanism is the internal spring 82 in the dual shaft assembly. This force is less than the required force to keep the trigger locking mechanism engaged allowing the system to self-disengage when the flow is stopped. In particular, in this circumstance, the internal dual shaft force (considering friction between the catch 44 and the engaging element 46) is less than the torsional force on engaging element 46 due to spring 52.

It can thus be seen that the present invention provides a novel fuel dispensing nozzle. Although the invention has been described using preferred embodiments, configurations, and components, any combinations of these features are included within the scope of the invention. Moreover, variations and modifications as would be recognized by those skilled in the art are within the scope of the present invention. Explanation is by way of example only and the disclosure is not meant to be limiting.

The invention claimed is:

1. A fuel dispensing nozzle comprising:

a nozzle body defining a dispensing path;

a fuel flow valve disposed in said nozzle body;

an actuation assembly movable to open said fuel flow valve;

a hand lever pivotally connected with respect to said nozzle body, said hand lever being operatively connected to said actuation assembly so as to cause opening of said fuel flow valve when said hand lever is pivoted in a valve opening direction; and a hold open mechanism including:

a trigger pivotally connected to said hand lever and having an engaging element;

a spring urging said trigger into a free state such that said engaging element is normally resting against a back side of said hand lever and said engaging element is moved away from a back side of said hand lever when said trigger is moved into a position to maintain fluid flow; and a catch member fixed with respect to said nozzle body, said catch member defining a plurality of catches corresponding to respective flow positions, said catches each configured to receive said engaging element of said trigger.

2. A fuel dispensing nozzle as set forth in claim 1, wherein each of said catches of said catch member is generally U-shaped having a leading side and a trailing side.

3. A fuel dispensing nozzle as set forth in claim 1, further comprising a hand guard extending from said nozzle body, wherein said catch is connected directly to said nozzle body.

4. A fuel dispensing nozzle as set forth in claim 1, wherein said hand lever is generally L-shaped with a shorter portion and a longer portion substantially perpendicular to each other, said longer portion forming a grasping portion.

5. A fuel dispensing nozzle as set forth in claim 4, wherein said actuation assembly is engaged by the shorter portion of said hand lever.

6. A fuel dispensing nozzle as set forth in claim 5, wherein said trigger is pivotally connected to said hand lever at a pivot point substantially at an intersection of said shorter portion and said longer portion of said hand lever.

7. A fuel dispensing nozzle as set forth in claim 5, wherein said engaging element comprises a cross pin carried by a body of said trigger at a location spaced apart from the pivot point of said trigger.

8. A fuel dispensing nozzle as set forth in claim 7, wherein said body of said trigger defines a tab portion at an end of said body opposite the pivot point, said tab portion being contoured to facilitate engagement by a user's index finger.

9. A fuel dispensing nozzle comprising:

a nozzle body defining a dispensing path;

a fuel flow valve disposed in said nozzle body;

an actuation assembly movable to open said fuel flow valve, wherein said actuation assembly comprises:

a dual shaft assembly having a first shaft axially movable with respect to a second shaft, said second shaft being urged apart from said first shaft by an actuation assembly spring; and wherein a spring force due to said actuation assembly spring alone is insufficient to maintain said engaging element of said trigger in said catch;

a hand lever pivotally connected with respect to said nozzle body, said hand lever being operatively connected to said actuation assembly so as to cause opening of said fuel flow valve when said hand lever is pivoted in a valve opening direction; and a hold open mechanism including:

a trigger pivotally connected to said hand lever and having an engaging element;

a spring urging said trigger into a free state such that said engaging element is normally resting against said hand lever; and a catch member fixed with respect to said nozzle body, said catch member defining a plurality of catches corresponding to respective flow positions, said catches each configured to receive said engaging element of said trigger, wherein each of said catches of said catch member is generally U-shaped having a leading side and a trailing side.

10. A fuel dispensing nozzle as set forth in claim 9, wherein said spring force of said actuation assembly spring falls in a range of 4 to 8 pounds.

* * * * *